(No Model.) 3 Sheets—Sheet 1.

B. F. PERKINS.
FILTERING APPARATUS.

No. 401,057. Patented Apr. 9, 1889.

Witnesses,
Wm. F. Bellows
G. M. Chamberlain.

Inventor,
Benj. F. Perkins,
By his Attorneys, (No Model.) 3 Sheets—Sheet 2.
B. F. PERKINS.
FILTERING APPARATUS.
No. 401,057. Patented Apr. 9, 1889.
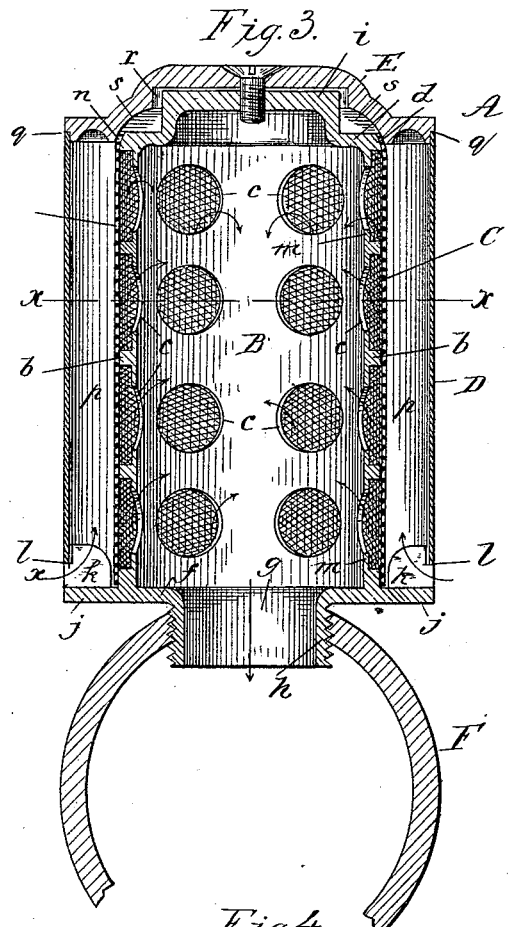
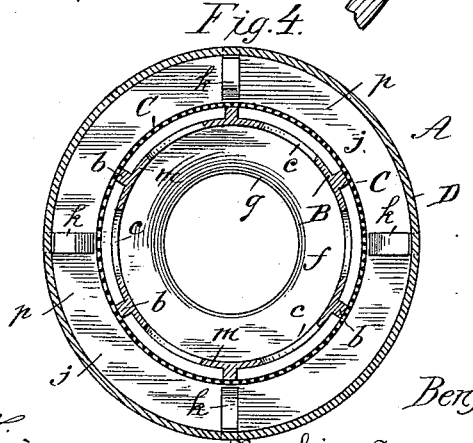
Witnesses
Wm. F. Bellows
G. M. Chamberlain
Inventor
Benj. F. Perkins,
By his Attorneys, (No Model.) 3 Sheets—Sheet 3.
B. F. PERKINS.
FILTERING APPARATUS.
No. 401,057. Patented Apr. 9, 1889.
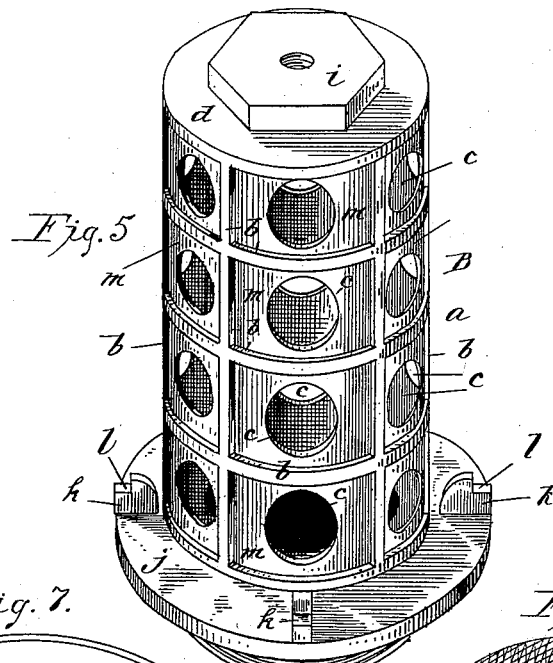
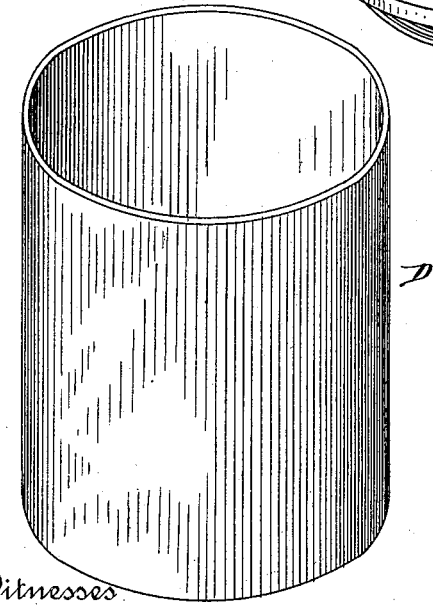
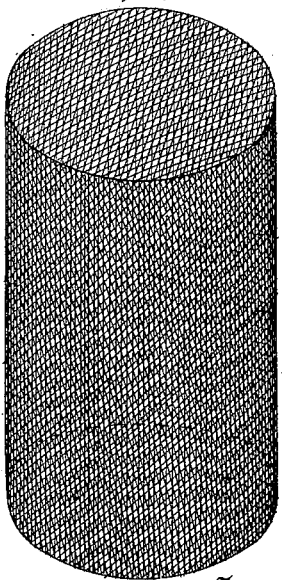
Witnesses
Wm. J. Bellows
G. M. Chamberlain
Inventor
Benj. F. Perkins
By his Attorneys,

UNITED STATES PATENT OFFICE.

BENJAMIN F. PERKINS, OF HOLYOKE, MASSACHUSETTS.

FILTERING APPARATUS.

SPECIFICATION forming part of Letters Patent No. 401,057, dated April 9, 1889.

Application filed November 20, 1888. Serial No. 291,400. (No model.)

*To all whom it may concern:*

Be it known that I, BENJAMIN F. PERKINS, a citizen of the United States of America, residing at Holyoke, in the county of Hampden and State of Massachusetts, have invented new and useful Improvements in Filtering Apparatus, of which the following is a specification.

This invention in filters relates to that class thereof for filtering large quantities of water in which a plurality of strainer-filters are placed in and work in conjunction with a common filter-tank having a filtering medium consisting of a body of gravel or sand, or both, or other equivalent material or materials; and the invention particularly relates to the construction of the strainer-filter to be employed as above, the object thereof being to increase the efficiency of such filter for its filtering action, and also to permit of a cleansing thereof and of the granulated filtering medium by a reverse current, and, further, to permit, when desired, of a ready disunion of the parts of said device for a more effective cleansing than by the reverse currents; and the invention consists in the constructions and combination of the various parts, all substantially as will hereinafter more fully appear, and be set forth in the claims.

Reference is to be had to the accompanying drawings, forming part of this specification, in which similar letters of reference indicate corresponding parts in all the views.

Figure 1:
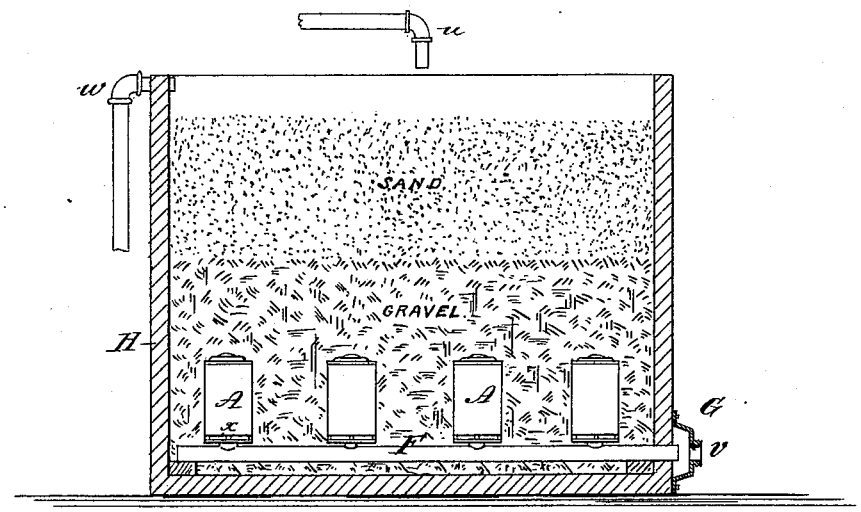
Figure 2:
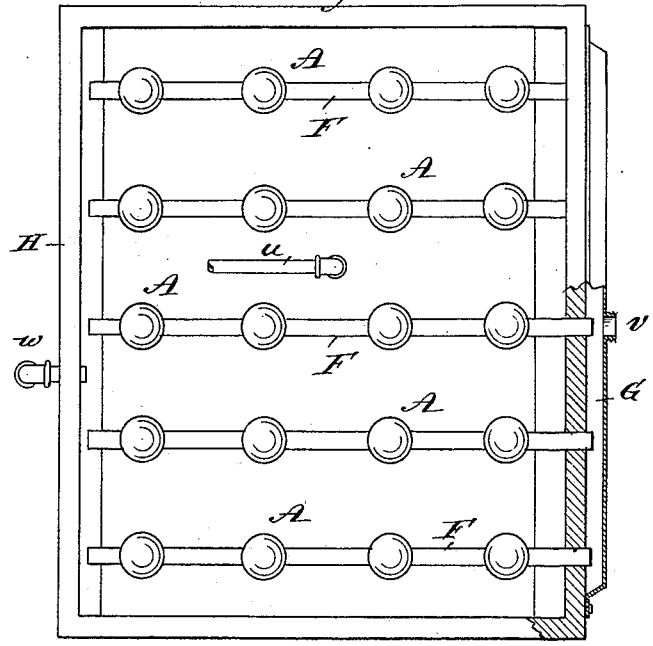

Figure 1 is a vertical cross-section of a filter-tank embodying a multiplicity of strainer-filters therein, and Fig. 2 is a plan view of the same with the granulated filtering medium removed. Fig. 3 is a central vertical section of one of the cylindrical strainer-filters. Fig. 4 is a horizontal section thereof on the line *x x*. Figs. 5, 6, 7, and 8 are perspective views of the separate parts composing the strainer-filter, as will plainly appear.

As shown in said perspective views, the said parts of the filter A consist in a central metallic body or frame, B, a strainer-shell, C, an outer inclosing shield and casing, D, and a lid, E, for covering and closing the top of the filter and confining the parts in place. For purposes of convenience and practicability the said parts are made of circular and cylindrical form; but it will be obvious that the shape of said parts may be modified without departing in any respect from the invention. The said frame B consists of the vertical body portion *a*, having longitudinal and transverse intersecting ribs *b*, within which are openings *c*, said skeleton-like frame being closed by a top wall, *d*, and also provided at its bottom with a wall, *f*, through which, however, is formed an axial opening, *g*, surrounded by the hollow boss *h*, which is exteriorly tapped for engaging the screw-threaded opening in a pipe, F, for carrying several strainer-filters, and the top wall is exteriorly provided with a polygonal projection, *i*, for the turning by a wrench of the said frame B into the pipe-opening, and the bottom wall is continued in an outwardly-extending ledge or platform, *j*, on which lugs *k k* are cast or secured, each having a step, *l*, and extending by its inner portion nearly to the plane of the outer surface of the skeleton frame. The area within and below the outer surface of the ribs may be more or less occupied by a web, *m*, integrally cast with the ribs, through which, however, the apertures *c* are formed, and all according to the freedom of passage desired for the water into and through said body.

The strainer-shell C is of cylindrical form open at each end and closely fitting against the ribs of the body B, for covering the entire area thereof at which said apertures are formed, the said body at its upper edge being, if desired, chamfered down, as at *n*, Fig. 3, and the top of said shell, when secured in place, inwardly deflected for a seating thereof on said chamfered portion. Said shell may be formed from wire-gauze or from finely-perforated sheet metal, as desired. The inclosing-shield D is also of cylindrical form open at each end and of a diameter somewhat greater than that of the strainer-shell, so that when supported in place on the steps of the lugs *k* a space, *p*, will be left entirely around the strainer and the interior walls of said shield, and a water-ingress, K, also insured at the bottom thereof.

The closing-lid is provided with a groove or rabbet, *q*, at its edge to lie upon and over the top edge of said shield, within which is a chamber, *r*, having flaring walls *s* at one portion thereof to lie over and bind the inwardly-tapered portion of the strainer-shell on the top and side walls of the skeleton body, and a screw passing axially through said cap into the top wall of the body B secures all the parts immovably in place.

In lieu of the outer shield or casing being supported above the platform of the body, it may extend to said bottom, but at such portion provided with one or more apertures for the entrance of the water to the annular chamber outside of the strainer-shell.

In operation, with one or a series of said filters, as above described, connected to a pipe, F, (several of which are to be employed in a filter-tank, H,) and a quantity of coarse filtering material, as gravel, inclosing and covering same to a considerable depth, surperposed by a considerable body of finer filtering material, as sand or ground quartz, water entered to the top of said tank through a supply-pipe, $u$, thence percolates through the sand and gravel to the lower portion of the tank, thence into the lower casing-openings, $k$, to and rising in the surrounding chamber $p$, thence through the said strainer-shell to and through the openings between and within the skeleton ribs to the interior of the body, and thence to the pipe F, by which it is conducted to the outside of the tank; and where several of said filter-carrying pipes are used they are by their forward ends entered to a common box or chamber, G, supplementary to the tank, which has a single discharge-opening, $v$, at which a suitable connection may be made for conveying the filtered water in any desired manner away for its consumption.

Under the arrangement of the filtering system and of the construction of the individual strainer, filters, and co-operating elements described, it will be plain that by the attachment of a pipe from a pump at the said chamber-opening $v$ and forcing water therein (which would usually be filtered water) the same will pass through the pipes F into the filter-bodies B, through the strainer-shells C and annular chambers $p$, to the exterior thereof, thence upwardly through the granulated or powdered filtering medium to the top of the tank, where by the overflow-pipe $w$ it may be conveyed away, all dirt and impurities which may have accumulated in or on the various parts or filtering agents being carried away with said reversely-directed water.

What I claim as my invention is—

1. In a filter, in combination, a body comprising open-work sides formed by intersecting ribs, a closed top and an opening through its bottom, a strainer-shell fitting upon and surrounding the open-work sides of said body, a casing of larger diameter than said strainer-shell supported to surround same, whereby a chamber between said casing and strainer-shell is formed with openings leading to the bottom thereof from the exterior of the filter, and means for closing the top of said chamber, substantially as and for the purpose described.

2. In a filter, in combination a body comprising open-work sides formed by intersecting ribs, a closed top, an opening through its bottom, and the outlying ledge $j$, provided with the lugs $k$, a strainer-shell fitting upon and surrounding the open-work sides of said body, a casing of larger diameter than said strainer-shell resting on said lugs, whereby a chamber is formed between the said casing and shell, an opening at the lower edge of said shell leading to said chamber, and means for closing the top of said chamber, substantially as described.

3. In a filter, in combination, a body comprising open-work sides formed by intersecting ribs, a closed top, an opening through its bottom, and the outlying ledge $j$, provided with the lugs $k$, a strainer-shell fitting upon and surrounding the open-work sides of said body, a casing of larger diameter than said strainer-shell resting on said lugs, and a cover bearing against the upper ends of said strainer-shell and casing for confining same in their positions and closing the top of the chamber which is formed between the casing and strainer-shell, substantially as and for the purpose described.

4. In a filter, in combination, a body comprising open-work sides formed by intersecting ribs, a closed top externally provided with a polygonal projection, an opening through its bottom surrounded by an externally-screw-threaded boss and having the outlying stepped lugs $k$, a strainer-shell fitting upon and surrounding the open-work sides of said body, a casing of larger diameter than said strainer-shell resting on said lugs, a cover bearing against the upper ends of said strainer-shell and casing for confining same in place for covering the chamber which is formed between the casing and strainer-shell and covering the top of said body, and a screw passing through the said cover and into the top of said body.

5. In a filtering apparatus, the combination, with a filter-tank provided with a supplemental box, G, having an outlet-opening, and a series of pipes, F, in said tank leading and open to said box G, of a series of strainer-filters each comprising a body having open-work sides, a closed top and an opening through its bottom leading to the passage of its carrying-pipe F, a strainer-shell fitting upon and surrounding said open-work sides of the body, a casing of larger diameter than said strainer-shell supported to surround same, forming the chamber $p$, and the lower opening leading thereto, and a lid for closing the top of said chamber, and a body of granulated filtering material or materials in said tank enveloping said series of filters, substantially as and for the purpose described.

BENJAMIN F. PERKINS.

Witnesses:
H. A. CHAPIN,
G. M. CHAMBERLAIN.